United States Patent Office 2,696,484
Patented Dec. 7, 1954

2,696,484

PROCESS OF SEPARATING THE OXYTOCIC PRINCIPLE OF THE POSTERIOR PITUITARY

Heron O. Singher, Plainfield, and Charles R. Harmison, Somerville, N. J., assignors to Ortho Pharmaceutical Corporation, a corporation of New Jersey No Drawing. Application February 13, 1951, Serial No. 210,797

1 Claim. (Cl. 260—112)

This invention relates to new and useful improvements in purification and isolation of the oxytocic principle of the posterior lobe of the pituitary gland and in particular to a process for separating the oxytocic principle from the other principles of the posterior lobe of pituitary gland and in particular to a process for separating the oxytocic principle from the pressor and anti-diuretic principles of the posterior lobe, of the pituitary by preferential adsorption of the pressor and anti-diuretic principles on an artificial zeolite.

An aqueous extract of the posterior lobe of the pituitary gland contains therapeutically active constituents including the oxytocic principle which has the property, when administered hypodermically, of stimulating uterine contractions; the pressor principle which, when administered hypodermically, has the effect of increasing the blood pressure; and the anti-diuretic principle which, when administered hypodermically, has the effect of decreasing urine output.

The separation of extracts of the posterior lobe of the pituitary gland into two fractions, one containing the oxytocic principle substantially free from the pressor principle, and the other containing the pressor principle substantially free from the oxytocic principle, has been accomplished by fractional precipitation from 98 per cent acetic acid solution by acetone, ether, and petroleum ether, and also by fractional precipitation from mixtures of alcohol and ethyl acetate. Other investigators have effected a considerable separation by electrophoresis and countercurrent extraction. Potts and Gallagher, The Journal of Biological Chemistry, vol. 154, Number 2, July 1944, reported a rapid, simple separation in high yield of the oxytocic and pressor pituitary principles by an adsorption process in which the adsorbent was Decalso prepared according to Folin. These investigators reported the degree of purification of the two principles accomplished by their adsorption process was not great.

Separation of the oxytocic and pressor pituitary principles by fractional precipitation and adsorption procedures have furnished the oxytocic principle to the medical profession substantially free from the pressor principle, but a complete separation of these two principles has not been reported. The oxytocic principle has been widely accepted and used by the medical profession because of its ability on hypodermic administration to stimulate uterine contractions, but in certain instances the use of this principle when accompanied by even small amounts of the pressor principle is contraindicated, particularly when the blood pressure of the patient is high. Toxemia of pregnancy is frequently accompanied by high blood pressure and the use in such patients of a substance which raises blood pressure is considered highly undesirable.

It is the primary object of this invention to provide an improved process for the separation of the oxytocic principle from the other principles of the posterior pituitary and to obtain a highly purified oxytocic principle which upon administration hypodermically has no physiological effect other than stimulation of uterine contractions.

It is another object of this invention to completely separate the oxytocic principle from the pressor principle of the posterior lobe of the pituitary and to obtain a highly purified oxytocic principle which upon administration hypodermically has no effect of increasing the blood pressure.

Another object of this invention is to provide an improved process for the separation of the oxytocic principle from the pressor and anti-diuretic principles of the posterior pituitary by adsorption of the pressor and anti-diuretic principles on an artificial zeolite.

Still another object of this invention is to provide an improved process for the separation of the oxytocic principle from the pressor and anti-diuretic principles in a posterior pituitary extract by adsorption of the pressor and anti-diuretic principles on an artificial zeolite and removal of inactive proteinaceous material and inorganic salts from the extract by a heat treatment.

In general the improved process consists in passing an aqueous extract of the posterior pituitary through a column of specially prepared artificial zeolite whereby the pressor principle is completely adsorbed on the zeolite and the anti-diuretic principle is substantially completely adsorbed on the zeolite and the oxytocic principle passes through the column of adsorbent, and heating the solution containing the oxytocic principle whereby inactive proteinaceous materials and inorganic salts are precipitated.

The process of this invention begins with the extraction of posterior pituitary powder with distilled water. It is preferable that the aqueous extract contain more than 10 and less than 20 units of oxytocic activity per cc.; if the extract contains less than 10 units per cc., the process will yield a solution of the oxytocic principle having less than 10 units per cc. of activity, and if the extract contains more than 20 units of activity, the process will not completely separate the pressor principle from the oxytocic principle. The aqueous extract is centrifuged to remove any insoluble material and passed through an adsorption column containing a specially prepared artificial zeolite.

The adsorbent in the adsorption column is prepared from an artificial zeolite manufactured and sold by The Permutit Company under the trade-mark Decalso. This substance has the following chemical formula:

$$Na_2O.Al_2O_3.(SiO_2)_x.y(H_2O)$$

in which $x$ has a value of 5.5 to 6.5, and $y$ has a value of from 3 to 5. The artificial zeolite known as Decalso is treated with dilute acid and washed to adjust the sodium content. In order for a complete separation of the pressor principle from the oxytocic principle to be obtained it is necessary for the artificial zeolite used as an adsorbent to have a sodium content of from 8 to 9 per cent.

An artificial zeolite having a sodium content within the critical range of from 8 to 9 per cent is prepared by adding Decalso of 50 to 80 mesh to 2 to 5 times its weight of distilled water. If the weight of distilled water is less than twice the weight of Decalso, the slurry is too thick for satisfactory manipulation, and if the weight of water is more than five times the weight of Decalso, a satisfactory separation of the pressor principle from the oxytocic principle will not be made. 170 cc. of dilute sulfuric acid, having a concentration of from 2.3 to 2.7 per cent by weight, for each 1000 grams of Decalso, is added rapidly to the slurry until the pH thereof is 5.8 and then the remainder of the acid is added at a rate whereby the pH of the slurry is maintained between 5.8 and 6.0. After addition of the acid is complete, the pH of the slurry reaches equilibrium very rapidly and is not allowed to go above 6.1. When the pH of the slurry reaches at least 6.0 but is below 6.1 an amount of distilled water equal to approximately twice the weight of the Decalso in the slurry is immediately added. The final pH of the slurry is between 5.8 and 6.0. The adsorbent is then repeatedly washed with amounts of distilled water equal to twice the weight of the Decalso in the slurry until the change in pH of the slurry between two consecutive washings is 0.05 pH units or less. The pH of the slurry after the final washing is between 7.7 and 9.0 and the water is removed, then an amount of distilled water approximately equal to twice the weight of the adsorbent is added. One gram of concentrated sulfuric acid for each 1000 grams of adsorbent is added to the slurry to bring the concentration of sulfuric acid to 0.03 to 0.07 per cent. The slurry is stirred for thirty minutes, allowed to settle and the water is decanted. The adsorbent is washed with amounts of distilled water equal in weight to approximately twice the weight of the original Decalso until successive washings show a change in pH of 0.05 units or less or until there is a drop in pH after a washing. The final pH of the slurry, when the weight of water is approximately twice the original weight of adsorbent, is within the range of from 7.9 to 9.0. The water is removed by filtration and the adsorbent is dried. Drying of the adsorbent is preferably done at 105° C. and is continued until the weight of the adsorbent is constant.

Adsorbent sufficient in amount to furnish a column 38 to 45 cm. in length is poured into about 15 times its weight of 0.25 per cent acetic acid, this amount of liquid being sufficient to wet the adsorbent and facilitate transfer thereof to a tube. The length of the column of adsorbent is between 38 to 45 cm., regardless of the amount of aqueous extract of posterior pituitary gland to be passed therethrough. If the length of the column is less than 38 cm., the pressor principle will not be completely adsorbed from an extract of posterior pituitary glands; and if the length of the column of adsorbent is greater than 45 cm., the pressor principle will be completely adsorbed, but some of the oxytocic principle will also be adsorbed on the column. The diameter of the column may be varied to obtain different volumes of eluate, but since the ability of the adsorbent to adsorb the pressor principle is limited, a sufficient amount of the adsorbent must be in the column to completely adsorb all of the pressor principle present in the posterior pituitary extract passed through the column.

The extract of posterior pituitary gland is run through the column at such a rate as to maintain a flow rate of from 2.1 to 2.6 cubic centimeters per minute per square centimeter of cross-sectional area of the column. The pH of the effluent is adjusted to 3.4 to 3.6 and the solution is then rapidly brought to a boiling temperature, boiled for 3 to 7 minutes and filtered to remove inactive proteinaceous precipitate containing occluded inorganic salts. It is important that the pH of the effluent be adjusted within the range of from 3.4 to 3.6 because if the pH is less than 3.4, some of the oxytocic factor is destroyed on subsequent heating of the solution; and if the pH is greater than 3.6, heat precipitation of inert proteins from the effluent from the column is incomplete. It is preferred that the time of boiling of the effluent after the pH has been adjusted be 4 to 5 minutes, but an effective precipitation of proteinaceous materials and inorganic salts is accomplished when the boiling time is 3 to 7 minutes. If the boiling time is less than 3 minutes, there is an incomplete precipitation of inactive proteinaceous material and inorganic salts, and if the time of boiling is greater than 7 minutes, some oxytocic activity is lost. The boiled and filtered solution containing the oxytocic factor is rendered sterile by passing through an appropriate filter and ampouled. This material has no demonstrable pressor activity, at least 10 units of oxytocic activity per cc., and no more than 0.01 unit of anti-diuretic activity for each 10 units of oxytocic activity.

The invention will be further illustrated by the following example dealing with the preparation of the adsorbent material, the preparation of the extract of the posterior lobe of the pituitary gland, and the separation of the pressor and anti-diuretic principles from the oxytocic principle; but it is not intended that the invention be limited thereto.

*Preparation of adsorption column*

Two kilograms of Decalso, in which the particles varied in size within the range of from 50 to 80 mesh, were stirred with 8 liters of distilled water. Dilute sulfuric acid containing 2.5 grams of concentrated sulfuric acid per 100 cc. of water was added to the stirred slurry of Decalso at a sufficient rate such that the pH of the slurry rapidly dropped to 5.8 to 6.0; further addition was made at such a rate as to maintain the pH of the slurry within the range of from 5.8 to 6.0. A total of 340 grams of dilute sulfuric acid was added in this manner, and when addition was complete, the pH of the slurry was 6.0. Four liters of distilled water were added to the slurry and excess liquid was removed by decanting after a short period of stirring. The slurry was rapidly washed with four liter portions of distilled water until the pH change of successive washes was less than 0.05 unit. The pH of the final wash was 8.60 and the final wash water was removed as completely as possible from the adsorbent by decanting. 3.85 liters of distilled water were added to the adsorbent to make a slurry. Two grams of concentrated sulfuric acid in 150 cc. of distilled water were added with stirring to the slurry and stirring was continued for thirty minutes, then four liters of distilled water were added; the pH of the supernatant liquid was 7.45. The supernatant liquid was removed by decanting and the adsorbent was rapidly washed with four liter portions of distilled water until the pH change of the supernatant liquid between successive washings was less than 0.05 unit. The pH of the final supernatant liquid was 8.80. The adsorbent was dried to constant weight at 105° C.

Five hundred grams of dried adsorbent prepared as above was added to 7.5 liters of 0.25 per cent aqueous acetic acid and stirred. The slurry of adsorbent was transferred to a glass tube having a diameter of 5.8 centimeters and a length of 60 centimeters. After the adsorbent had settled in the glass tube, the column had a height of 41 centimeters.

*Separation of pressor principle and anti-diuretic principle by adsorption on the adsorbent*

Eighteen grams of powdered posterior lobe of the pituitary gland were extracted with 1500 cc. of distilled water and the extract was centrifuged. The extract was slightly opalescent and yellow in color and had a volume of 1410 cc. The extract was added to the adsorption column at an initial rate sufficient to provide a head of from 10 to 13 centimeters and then at a rate to maintain the same head. The rate of addition of the extract to the adsorption column was also adjusted to maintain the rate of flow at the bottom of the column to an amount between 50 to 70 cc. per minute. The material coming through the column was discarded until it became slightly opalescent and pale yellow in color. The slightly opalescent pale yellow effluent from the column was collected and, after all of the extract had been passed through the column, the pH of the collected effluent was adjusted to 3.5. 1445 cc. of effluent having a pH of 5.76 were obtained. The effluent was stirred and heated to boiling, boiled for 5 minutes, and filtered to remove insoluble inactive proteinaceous material. The opalescent filtrate had a volume of 1220 cc. and contained 12 units of oxytocic activity per cc., no demonstrable pressor principle, and 0.01 unit of anti-diuretic activity for each 10 units of oxytocic activity.

Assays for oxytocic and pressor activity were made according to the method of U. S. Pharmacopeia, XIV Edition, pages 416–417. Assays for anti-diuretic activity were made according to the method on pages 180 ff. of the second edition of "Biological Standardization" published by the Oxford University Press in 1950 by Burn, Finney, and Goodwin.

We claim:

A method for the separation of the oxytocic principle from the pressor and anti-diuretic principles of the posterior lobe of the pituitary gland comprising; passing an aqueous extract of the posterior lobe of the pituitary gland containing not more than about 20 units of oxytocic activity per cubic centimeter through a 38–45 centimeter long column of artificial zeolite having a sodium content of 8 to 9 per cent, said artificial zeolite having been prepared by adding dilute sulfuric acid to a slurry in two to five times its weight of distilled water of a finely divided adsorbent compound having the formula $Na_2O.Al_2O_3.(SiO_2)_{x.y}(H_2O)$, in which $x$ has a value within the range of from 5.5 to 6.5 and $y$ has a value within the range of from 3 to 5, in an amount and at such a rate that the pH of the slurry is maintained between 5.8 and 6.0, adding distilled water to the slurry in an amount such that the pH of the slurry is stable at 5.8 to 6.0; repeatedly washing the adsorbent compound with distilled water until the pH of the slurry containing approximately twice the weight of water of the weight of original adsorbent is 7.7 to 9.0, adding an amount of concentrated sulfuric acid to the slurry sufficient to bring the concentration with respect thereto to 0.03 to 0.07 percent, stirring the slurry, allowing the slurry to settle, repeatedly washing the adsorbent with distilled water until the pH of the slurry containing approximately twice the weight of water of the weight of original adsorbent is 7.9 to 9.0, removing water from and drying the adsorbent; said aqueous extract being passed at a rate of flow through the column of 2.1 to 2.6 cubic centimeters per minute per square centimeter of cross-sectional area of the said column, whereby the pressor principle is completely adsorbed, the anti-diuretic principle is substantially completely adsorbed and the oxytocic principle passes through the column in aqueous solution; adjusting the pH of the aqueous solution containing the oxytocic principle to 3.4 to 3.6; and boiling the aqueous solution for 3 to 7 minutes, whereby inactive proteinaceous materials and inorganic salts are precipitated.

References Cited in the file of this patent

UNITED STATES PATENTS

| Number | Name | Date |
|---|---|---|
| 1,920,349 | Bockmuhl et al. | Aug. 1, 1933 |

FOREIGN PATENTS

| Number | Country | Date |
|---|---|---|
| 805,092 | France | Aug. 17, 1936 |

OTHER REFERENCES

J. Am. Chem. Soc., vol. 75, pp. 4879–81 (1953).

Science, vol. 118, p. 543 (1953).

"Pharmaceutical Activities at the I. G. Farbenindustrie Plant, Hochst am Main," July 1945, Office of Publication Board Report Number PB–981, reported by Kleiderer et al., pp. 45 to 47 (Microfilm).

Walton, article in Journal of Chem. Ed., page 454, September 1946.

Potts et al., article in Journal Biol. Chem., pp. 349–56, July 1944.